United States Patent
Kawasato

(10) Patent No.: US 9,424,361 B2
(45) Date of Patent: Aug. 23, 2016

(54) INFORMATION COMMUNICATION METHOD AND INFORMATION COMMUNICATION APPARATUS

(71) Applicant: Kabushiki Kaisha Toshiba, Minato-ku, Tokyo (JP)

(72) Inventor: Hisao Kawasato, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 55 days.

(21) Appl. No.: 14/263,910

(22) Filed: Apr. 28, 2014

(65) Prior Publication Data

US 2015/0122879 A1 May 7, 2015

(30) Foreign Application Priority Data

Nov. 6, 2013 (JP) ................................ 2013-230491

(51) Int. Cl.
*G06Q 30/00* (2012.01)
*G06F 17/30* (2006.01)
*H04L 29/06* (2006.01)

(52) U.S. Cl.
CPC .......... *G06F 17/30879* (2013.01); *G06Q 30/00* (2013.01); *H04L 67/42* (2013.01)

(58) Field of Classification Search
USPC .......... 235/375; 345/1.1; 705/5, 14.61, 14.58, 705/14.4
See application file for complete search history.

(56) References Cited

U.S. PATENT DOCUMENTS

| | | | |
|---|---|---|---|
| 2003/0149601 A1* | 8/2003 | Cabral | G06Q 10/02 705/5 |
| 2006/0050012 A1* | 3/2006 | Eller | G06Q 30/0277 345/1.1 |
| 2015/0169568 A1* | 6/2015 | Garcia-Barrio | G06K 9/46 382/190 |

FOREIGN PATENT DOCUMENTS

| | | |
|---|---|---|
| JP | 2012-018457 A | 1/2012 |
| JP | 2013-115545 A | 6/2013 |
| JP | 2013-186573 A | 9/2013 |

OTHER PUBLICATIONS

The Oracle article, "Using Sessions and Session Persistence in Web Applications" at https://docs.oracle.com/cd/E13222_01/wls/docs81/webapp/sessions.html, published on or before Nov. 27, 2011.*

* cited by examiner

*Primary Examiner* — Daniel Hess
(74) *Attorney, Agent, or Firm* — Knobbe, Martens Olson & Bear LLP

(57) ABSTRACT

According to one embodiment of the present disclosure, a portable terminal obtains an address for accessing a server from a signage terminal. The portable terminal generates a card for displaying a message in the signage terminal. The portable terminal transmits the card to the server. The signage terminal displays the card received from the server.

20 Claims, 19 Drawing Sheets

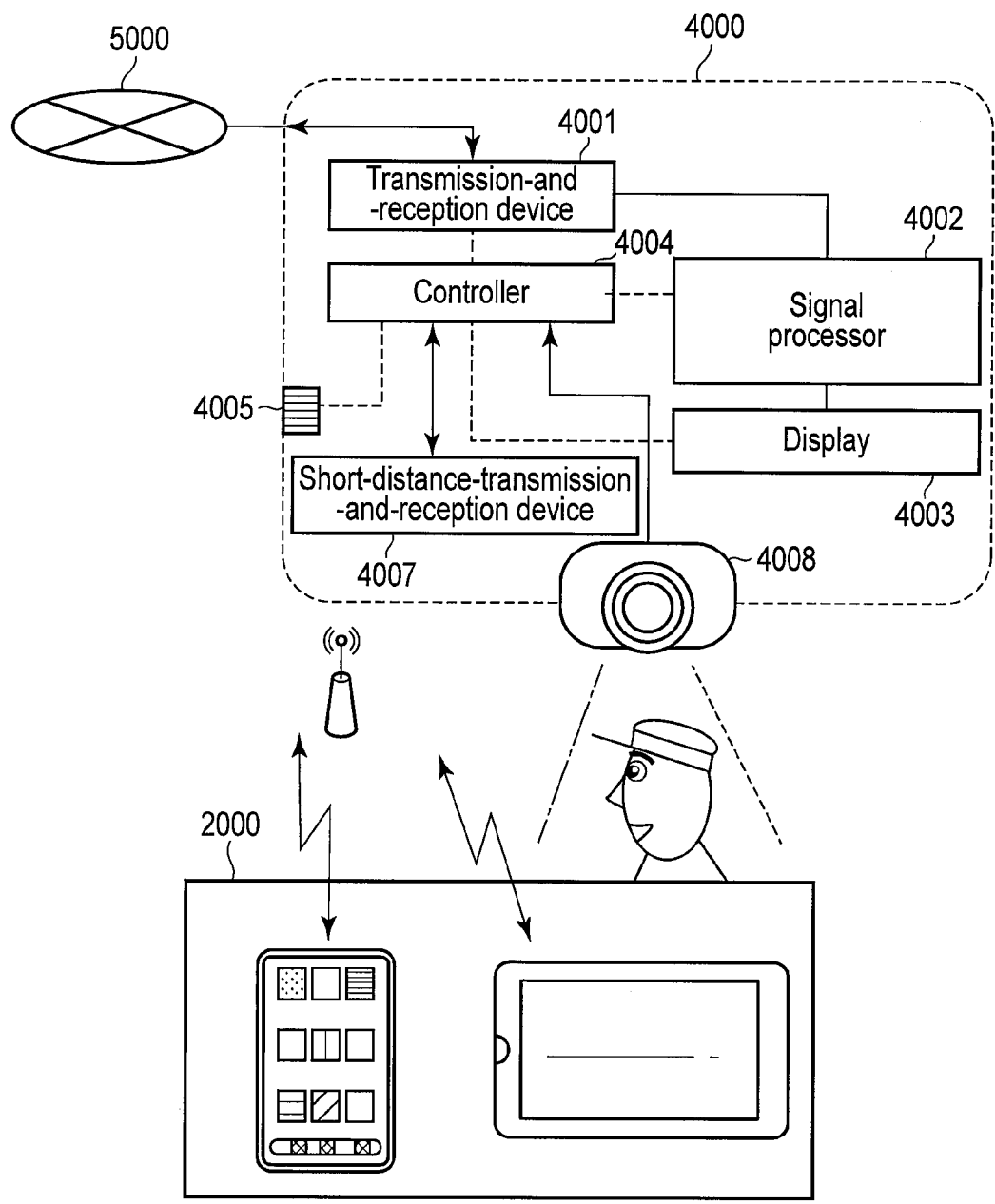
F I G. 5

INFORMATION COMMUNICATION METHOD AND INFORMATION COMMUNICATION APPARATUS

CROSS-REFERENCE TO RELATED APPLICATIONS

This application is based upon and claims the benefit of priority from Japanese Patent Application No. 2013-230491, filed Nov. 6, 2013, the entire contents of which are incorporated herein by reference.

FIELD

Embodiments described herein relate generally to an information communication method and an information communication apparatus.

BACKGROUND

As an electronic advertising system, there is a communication system called digital signage. In this communication system, a signage terminal is allocated as a display in more than one place indoors and outdoors. A signage terminal receives and displays a message for advertisement, etc., sent from a signage server. If a user viewing a signage terminal is interested in the message, the user can, for example, read the barcode of the advertisement by means of a portable terminal and contact the provider of the advertisement via the portable terminal.

The above-described signage terminal unilaterally delivers information of advertisement, etc., to viewers via the signage terminal. In view of the present situation, there are few users of such a signage terminal.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 5 is an explanation diagram shown for explaining a typical operation example of the embodiment, and shows a structural example of the signage terminal.

DETAILED DESCRIPTION

Various embodiments will be described hereinafter with reference to the accompanying drawings.

In general, according to one embodiment, there are provided an information communication method and an information communication apparatus. An object of the method and the apparatus is to improve the efficiency of use of digital signage by providing users with a variety of methods of using signage information.

According to an embodiment of the present disclosure, a communication method among a signage terminal, a server and a portable terminal is provided.

The portable terminal obtains an address for accessing the server from the signage terminal. The portable terminal generates a card for displaying a message in the signage terminal. The portable terminal transmits the card to the server. And the signage terminal displays the card received from the server.

Thus, the portable terminal can control an image of the signage terminal through the server.

Figure 1:
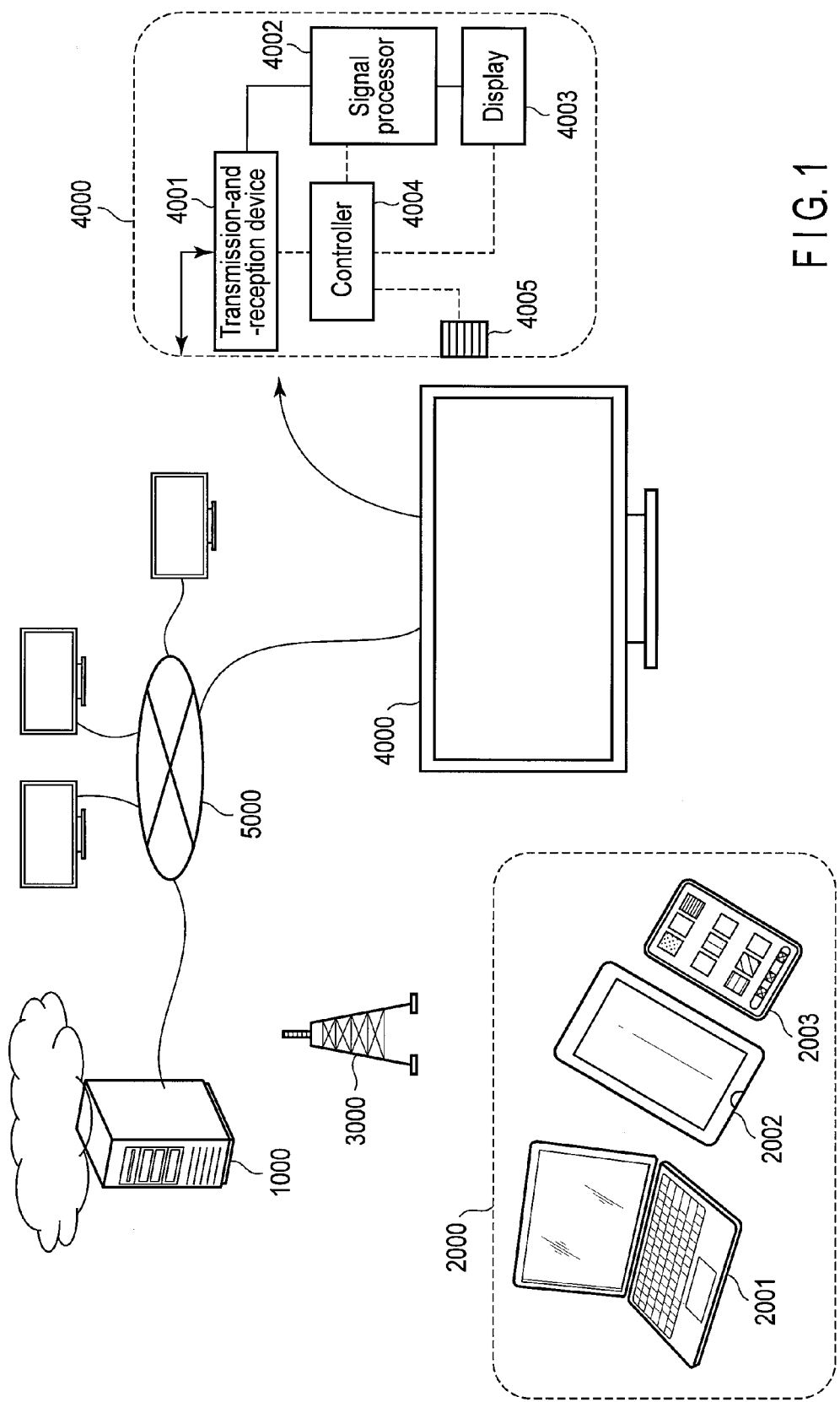
FIG. 1 is an exemplary view showing a schematic structure of digital signage to which an embodiment is applied.

Embodiments will be hereinafter described with reference to the accompanying drawings. In FIG. 1, for example, a cloud server (hereinafter, merely referred to as a server) is indicated by the reference number 1000. The server 1000 is configured to communicate with a portable terminal 2000 via a base station 3000. The portable terminal 2000 may be called a mobile device or mobile terminal.

The portable terminal 2000 includes, for example, a personal computer 2001, a tablet 2002 and a mobile phone (smartphone, etc.) 2003.

The server 1000 is connected to a signage terminal 4000 via a network (the Internet, a local area network, a wireless system, or a complex system of them, etc.,) 5000. Although one representative signage terminal is indicated by the reference number 4000 in the figure, there are more than one signage terminal. Signage terminals are placed in various environmental places either outside or inside buildings.

For example, the signage terminal 4000 is provided in a plurality of places in an event site, a plurality of places at a company, a plurality of places in a plant, a plurality of places in a station, a plurality of places in a supermarket or an outlet mall, a plurality of places in a department store, and a plurality of places in a hospital and facilities.

The signage terminal 4000 comprises a transmission-and-reception device 4001 connected to the Internet, a signal processor 4002 for processing transmission-and-reception signals, a display 4003, and a controller 4004 configured to conduct overall control. The signage terminal 4000 may comprise a connection terminal 4005 for connecting a USB flash memory, etc.

Figure 2:
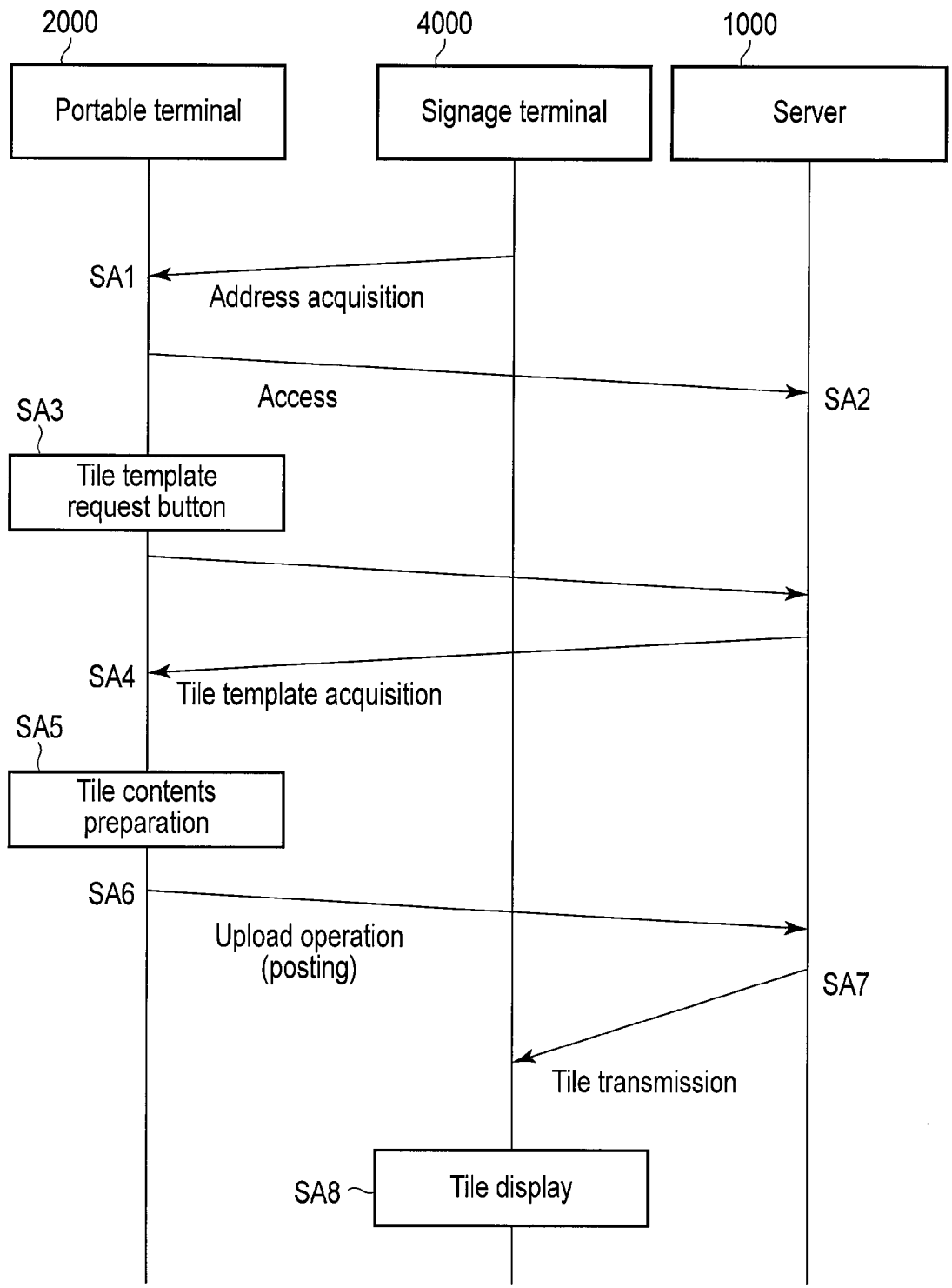
FIG. 2 is an explanation diagram shown for explaining a typical operation example of the embodiment, and shows an example of handling and operation timings.

FIG. 2 shows an example when the portable terminal 2000, the signage terminal 4000 and the sever 1000 mutually communicate with each other.

The portable terminal 2000 is configured to obtain an address from the signage terminal 4000 based on an operation by a user (step SA1). This address indicates, for example, a uniform resource locator (URL). Various methods can be used for obtaining the address. These methods will be explained later.

The portable terminal 2000 is configured to conduct line connection to the server 1000 by means of the obtained address. When a user wants to upload a message in the signage terminal 4000, the user requests the server 1000 for a card template (step SA3). In this case, for example, the user pushes a card-template request button of the portable terminal 2000.

Then, the server 1000 transmits a card template to the portable terminal 2000 (step SA4). Contents preparation as a card is implemented based on operations of the user in the portable terminal 2000 (step SA5).

As explained later, a card may be also referred to as a frame, a piece for generating an image, a template, a strip of paper, and a tile, etc., and thus, may be called in various ways. Here, for example, the term "card" encompasses the following meanings.

Cards may be regarded as images of a plurality of components attached to a signage screen. There are various types of components. The shapes of cards may be basically the same as each other. In the case of the same shape, cards can be easily arranged in the signage screen in order.

A vertically-long common shape may be standards of the shape of each card in such a way that the shape can be the same as the screen of the smartphone used by a user.

However, naturally, the shapes of cards may be different from each other. For example, a card may have a shape which is similar to the screen of the smartphone of each user, or a shape which is set or selected by each user. The size, color and shape, etc., of a card may be selected depending on the type of the contents to be delivered by the card, the user, and the category. For example, user A and user B who communicate with each other may determine the shape and color of the card used by the users. When a destination, etc., is reported, a card having a bus-shape, a card to which a bus mark is added, a card having a train-shape, a card to which a train mark is added, a card having a bicycle-shape, and a card to which a bicycle mark is added may be used depending on the transportation to be used.

Contents prepared by a user are stored in each card. When the card is posted, the card having the contents or the designed card is displayed and reproduced in the signage terminal.

The card having the contents or the designed card can be obtained in the screen of the portable terminal as an image from the signage board displayed in the signage terminal. Cards can be prepared by a signage provider as well as each user.

Characters, images, animation, and sounds, etc., can be added as categories to the contents of cards.

A card is attached to or placed in a predetermined position within the screen of a signage terminal. Alternatively, a card is hung or floated, and thus, a can be captured as a virtual sense.

For example, a way of dealing with a card can be explained with a sense of virtual space within a signage screen. For example, hooks or hanging tools are provided on a wall in advance. A user can hang a card in each hook, or bring a card hung in each hook. This kind of sense can be obtained.

In the sense of virtual space, the above "wall" serves as a whole signage screen, and the hanging tool is regarded as a frame in which each card is set.

Further, in the virtual space, a plurality of cards having the same contents may be piled and hung in one hook. Thus, lamination of a plurality of cards can be displayed in each frame. This example of use methods will be explained later.

A user prepares contents for a message, using a template on the screen of the portable terminal 2000. As the contents, there are character strings, photos to which comments are added, etc.

The user can write characters in a card template by looking at the screen of the portable terminal 2000 and operating a keyboard on the touch-panel. When the portable terminal 2000 has a touch-panel input function, it is possible to input characters by bringing the point of a stylus or a finger into contact with the portable terminal 2000. Further, when the portable terminal 2000 has a camera function, it is possible to combine a photo image with a card template.

The user can prepare a desired card (design) by adding the above-described contents such as characters and photos.

Next, when the user wants to upload the card to a server (that is a signage terminal), the user uploads the card by operating the portable terminal 2000 (step SA6). The card is sent to the server 1000, and the server 1000 transmits the card to the signage terminal 4000 (step SA7). In this manner, the card uploaded by the user is displayed in the signage terminal 4000. The card displayed in the signage terminal 4000 can be deleted by the user who uploaded the card. The action "uploading" may be also referred to as "posting" or "contributing".

The card displayed in the signage terminal 4000 can be downloaded by other users, or the user who uploaded the card. In this case, the number of downloading times may be set. The user conducts operations for uploading the prepared card in the server 1000. Before conducting the operations, the number of times for downloading the card may be limited to, for example, ten times, twenty times or thirty times. As the contents to be downloaded, there are recorded messages (texts), sounds and photos, etc.

As described above, a user can feel as if the user directly operates the signage terminal 4000 via the portable terminal 2000. The portable terminal 2000 and the signage terminal 4000 are in areas which are physically close to each other. Therefore, when the signage terminal 4000 displays the card (step SA8), the user can feel as if the user operates the signage terminal seen by himself/herself. In the portable terminal 2000, there is no need to hold its own (or common) application, and the above-described operation (as if the user directly operates the signage terminal 4000) is possible by the access to the signage terminal 4000.

Figure 3:
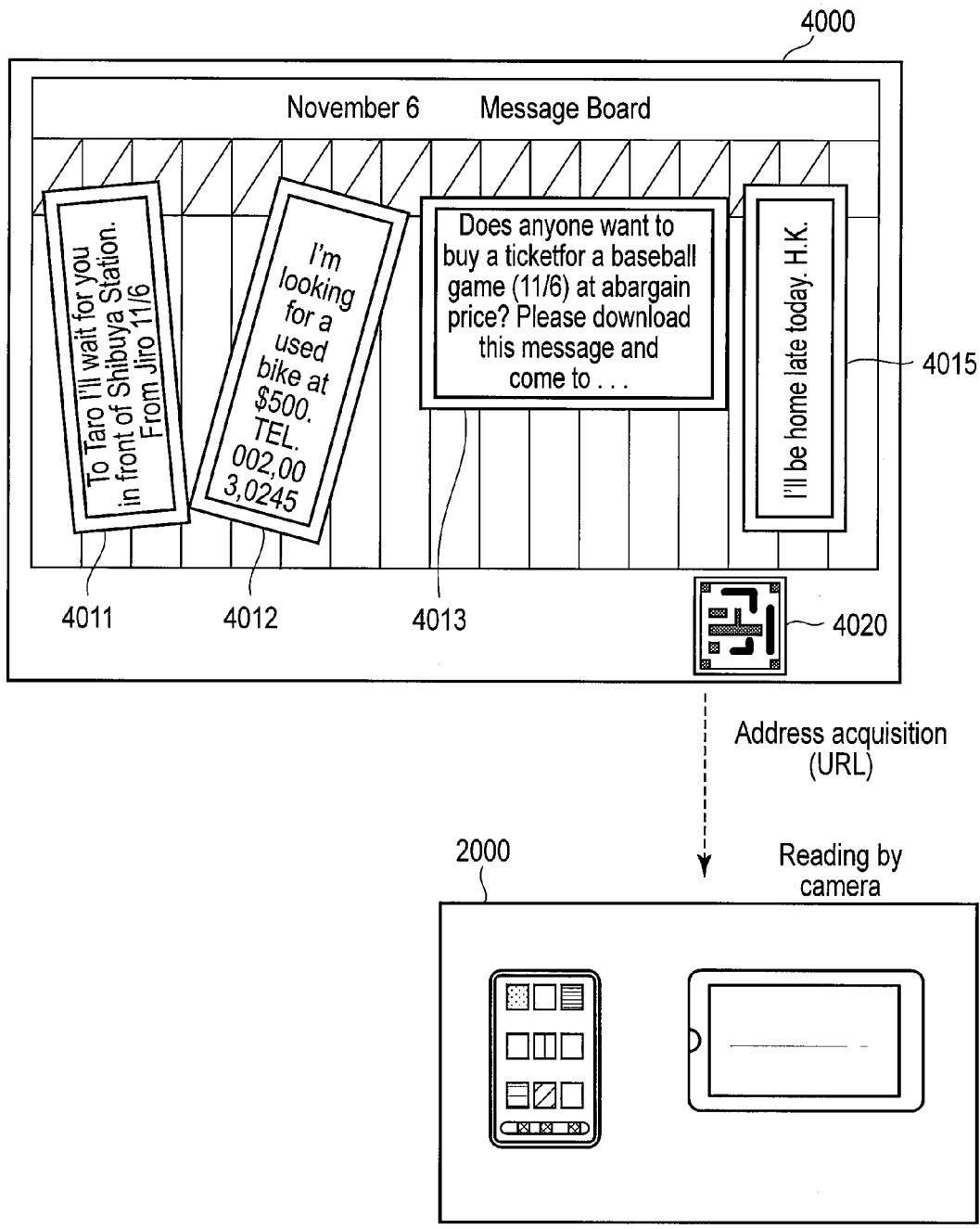
FIG. 3 is an explanation diagram shown for explaining the operation example of the embodiment, and shows a display example of a signage terminal.

FIG. 3 shows that cards 4011, 4012, 4013 and 4015 are displayed in the signage terminal 4000. The signage terminal 4000 is configured to display, for example, a QR code (registered trademark) 4020 (hereinafter, merely referred to as a code) in the same screen as the screen displaying the cards. This code includes a URL and provides an address for accessing the server 1000.

Apart from the above method, there are various methods for providing an address. An address may be provided by a barcode. Alternatively, an augmented reality (AR) technique, etc., may be applied. For example, when the characters "message board" of the signage terminal 4000 are photographed by the camera of the portable terminal 2000, an address for server access may be obtained as AR data.

The contents of the above code are switched to different contents depending on the time zone. The interval of switching time can be arbitrarily set at, for example, thirty minutes, one hour, two hours, three hours and four hours. By this time setting, naturally, the access address of the server 1000 is also switched to a different address.

A code is changed as described above in order to prevent the portable terminal 2000 from accessing the server 1000 from a place which is different from a place in which the signage terminal 4000 is set after the portable terminal 2000 which read the code stores the read code. Even if the portable terminal 2000 accesses the server 1000 in a different place from a place where the signage terminal 4000 is set, the user cannot see the image (card) of the signage terminal 4000.

Figure 4:
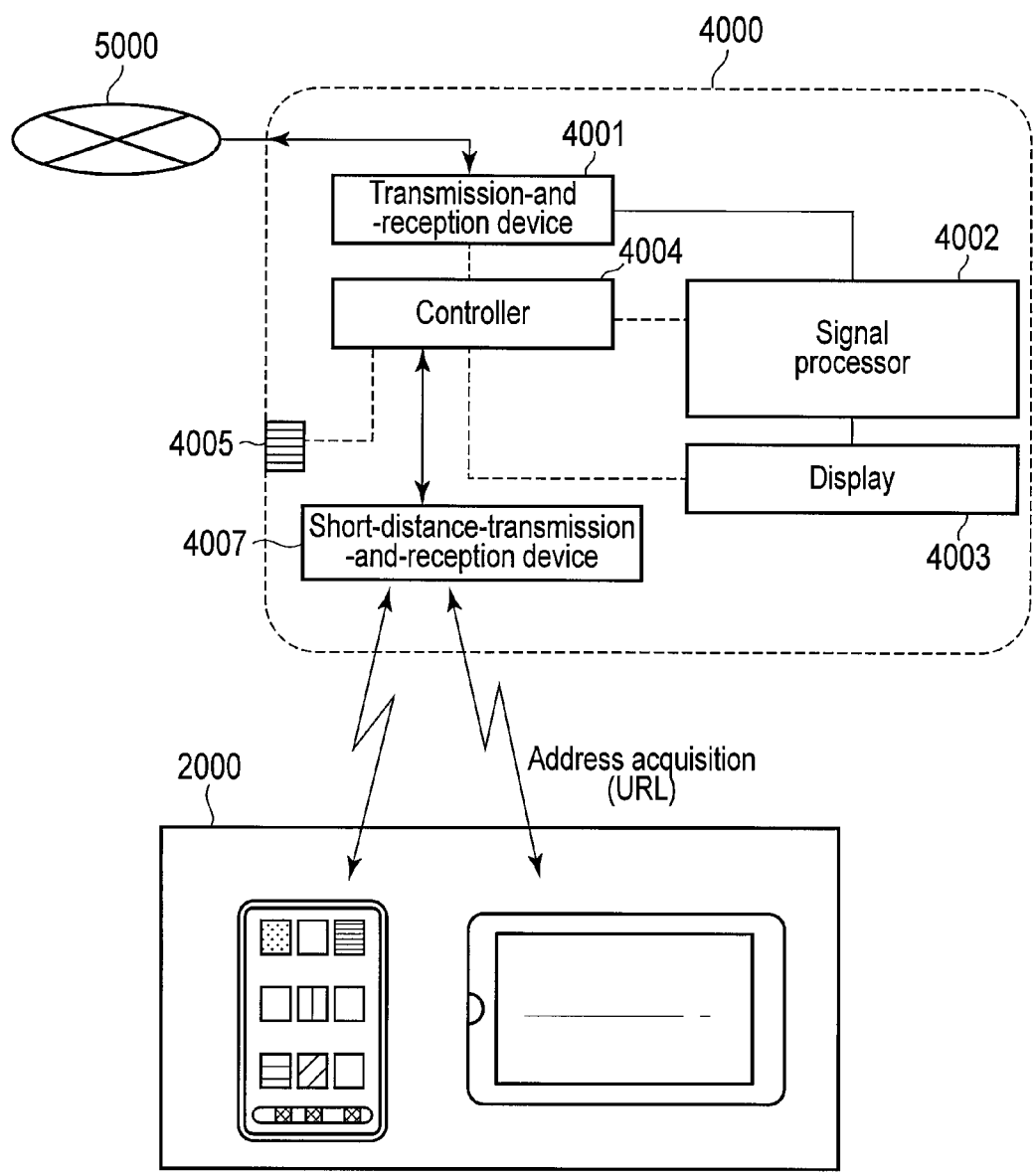
FIG. 4 is an explanation diagram shown for explaining a typical operation example of the embodiment, and shows a structural example of the signage terminal.

FIG. 4 shows an example in which the signage terminal 4000 further comprises a short-distance transmission-and-reception device 4007. The short-distance transmission-and-reception device 4007 may communicate with the portable terminal 2000, and provide the portable terminal 2000 with the address of the server 1000.

Weak electric waves, infrared rays, wireless fidelity (WiFi; compliant with IEEE802.11x), near field communication (NFC; low speed magnetic coupling), a Blutooth® compliant with IEEE802.15.1, transfer jet (very-short-distance-and-high-speed wireless communication), etc., may be applied to the short-distance transmission-and-reception device 4007.

When the signage terminal 4000 can recognize the portable terminal 2000 by the above short-distance communications, the following use may be executed. The signage terminal 4000 can recognize (acknowledge) that the portable terminal 2000 is located near the signage terminal 4000 by, for example, obtaining global positioning system (GPS) information from the portable terminal 2000.

For example, a communication partner may be restricted or controlled by installing an own application into the signage terminal 4000. For example, the signage terminal 4000 may reject communication with a specific partner. The address of the portable terminal of a specific partner may be transmitted to the server 1000. Further, when the signage terminal 4000 detects the address of the portable terminal of a specific partner, this detection may be informed to a specific server.

FIG. 5 shows an example in which the signage terminal 4000 further comprises the short-distance transmission-and-reception device 4007 and a camera 4008.

In this embodiment, it is possible to take an image of a user who is located near the signage terminal 4000 by means of the camera 4008 and specify the user. The signage terminal 4000 is configured to determine whether or not the user is positioned on the front surface side of the signage terminal 4000 and whether or not the user looks into the screen of the signage terminal 4000.

When a user is located in a specific area (imaging area) near the signage terminal 4000, the signage terminal 4000 can determine that the user is going to use the signage system. At this time, the signage terminal 4000 may give the user an operation guidance through sound or images.

In this embodiment, similarly, the signage terminal 4000 is configured to recognize a user and the portable terminal 2000. Therefore, for example, a user may be rejected from using the signage. Further, it is possible to transmit the face image of a user to the server 1000 or a specific server. By comparing the face image of a user with the face images of past users, it is possible to discover an inappropriate user.

Figure 6A:
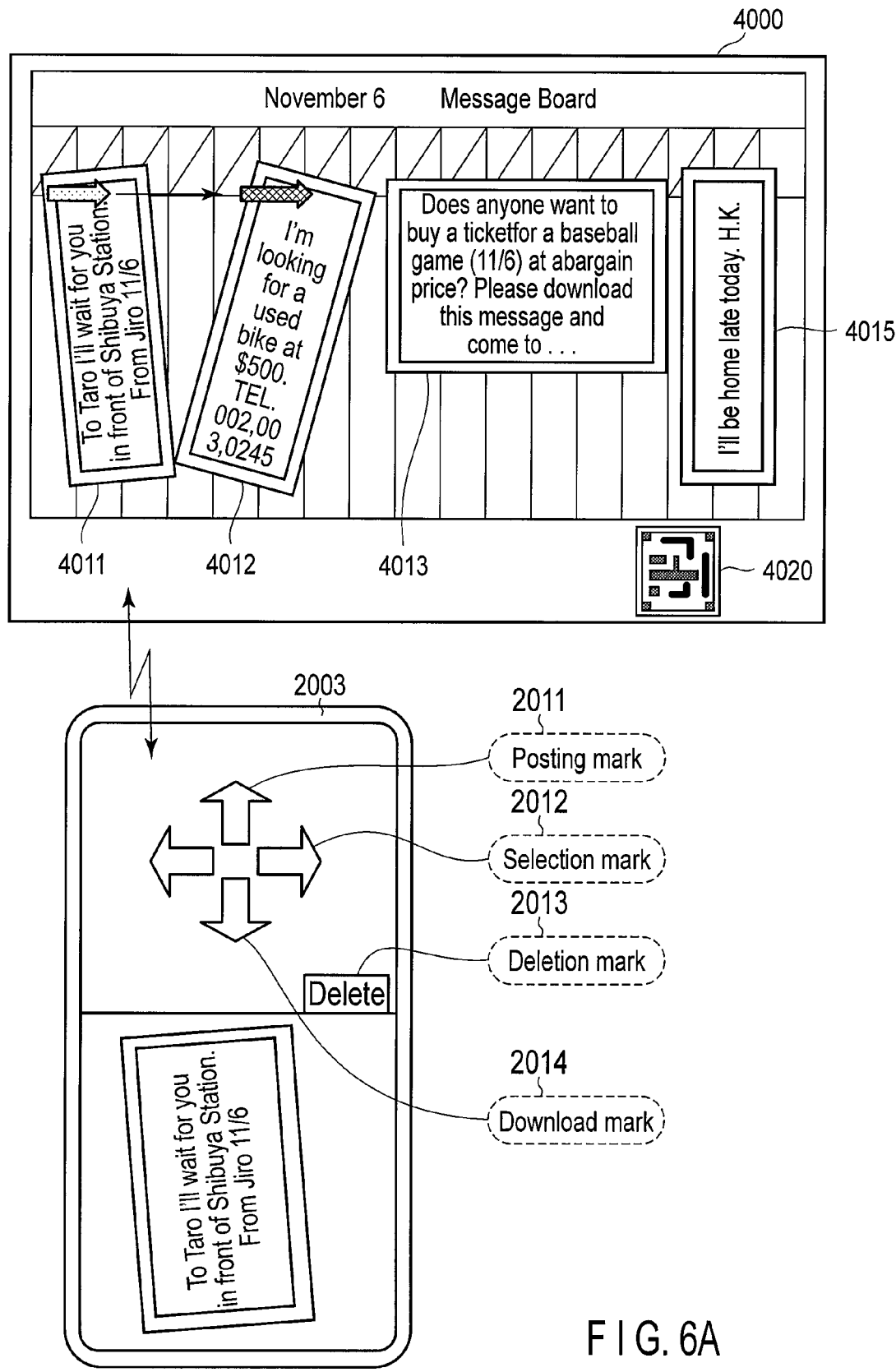
FIG. 6A is an explanation diagram shown for explaining a typical operation example of the embodiment, and shows a display example of the signage terminal and a handling example of a portable terminal.

FIG. 6A shows a display example of the signage terminal 4000 and an operation example of the portable terminal 2000 (2003). The portable terminal 2003 comprises a display which also serves as a touch-panel. When the portable terminal 2003 receives an address from the signage terminal 4000 and joins the signage system, the mode of the portable terminal 2003 shifts to a mode for operating the signage terminal 4000.

The portable terminal 2003 is configured to select (specify) one of the cards 4011 to 4015 displayed in the signage terminal 4000.

For example, a selection mark 2012 having arrow shapes is displayed in the display of the portable terminal 2003. When a user swipes the selection mark 2012 in the direction indicated by an arrow (right direction), the designated mark (an arrow mark) displayed in the signage terminal 4000 is configured to move from the position of a designated mark 4031 (the position of the card 4011) to the position of a designated mark 4032 (the position of the card 4012). Moreover, when the user swipes the selection mark 2012 in the arrow direction (right direction), the designated mark (the arrow mark) is configured to move to the position of the next card 4013. When the user swipes the selection mark 2012 in the direction indicated by an arrow (left direction), the designated mark moves to the position of the next card one by one in the left direction at each operation (swipe). In this manner, the user can specify the desired card.

The portable terminal 2003 is configured to display a download mark 2014 in the display. For example, when the download mark 2014 is swiped in the arrow direction at a state where the card 4011 is designated, the portable terminal 2003 can obtain the card 4011. In practice, the card 4011 is sent from the server 1000 to the portable terminal 2003.

The portable terminal 2003 is configured to display a posting mark 2011 in the display. When the posting mark 2011 is swiped in its arrow direction, the prepared card can be displayed in the signage terminal 4000. In practice, the prepared card is transmitted from the portable terminal 2003 to the server 1000.

The portable terminal 2003 is configured to display a deletion mark 2013 in the display. A user can operate the selection mark 2012 and specify the card to be deleted by the designated mark. When the deletion mark 2013 is swiped or touched at a state where the card to be deleted is specified by the designated mark, the specified card is deleted. However, normally, cards which can be deleted are only the cards posted from the portable terminal 2003 which prepared the cards. A person who can delete a card is only the specific person (the administrator of the distal signage). The administrator can own, for example, a special validation key for operating the digital signage.

Figure 6B:
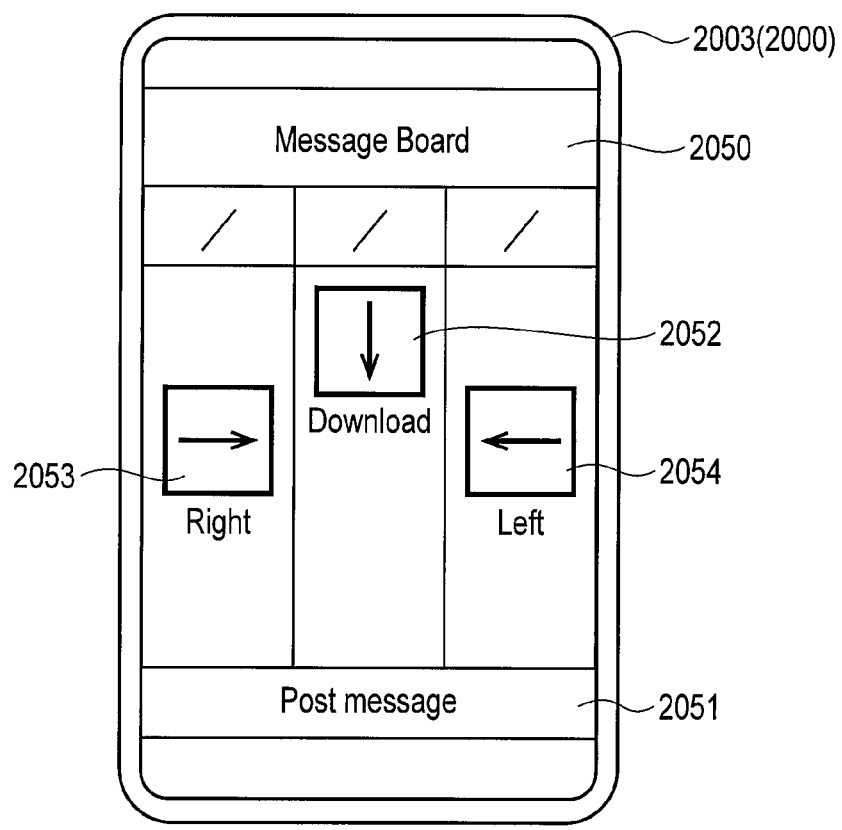
FIG. 6B is an explanation diagram shown for explaining the operation example of the embodiment, and shows a display example of the portable terminal.
Figure 6C:
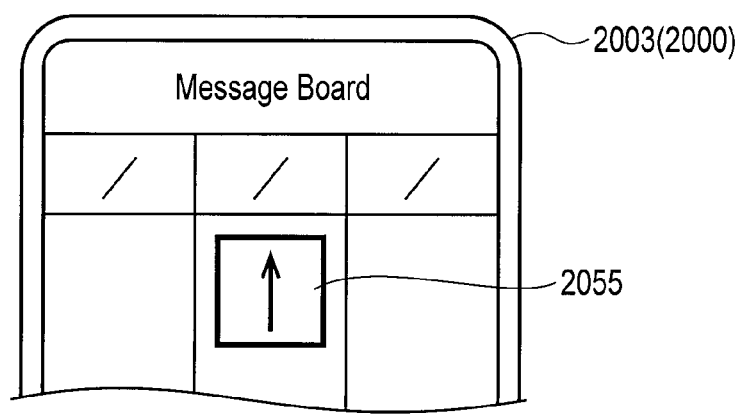
FIG. 6C is an explanation diagram shown for explaining the operation example of the embodiment, and shows a display example of the portable terminal.

The selection mark and the download mark in the portable terminal 2003 (2000) may be arranged (or displayed), for example, as shown in FIG. 6B so as to be an arrow mark (selection mark) 2052 from a background screen display 2050 configured to cause awareness of the message board toward the portable terminal 2003 (2000), a right direction arrow mark 2053 and a left direction arrow mark 2054. The right and left direction arrow marks 2053 and 2054 are configured to suggest movement from one column (item column) of the message board to the next column. Further, in the display example (arrangement) shown in FIG. 6B, a posting mark 2055 may be displayed with an arrow mark in a direction toward the message board (signage terminal) 4000 in the next screen (FIG. 6C) switched by turning a post message button 2051 on.

Figure 7:
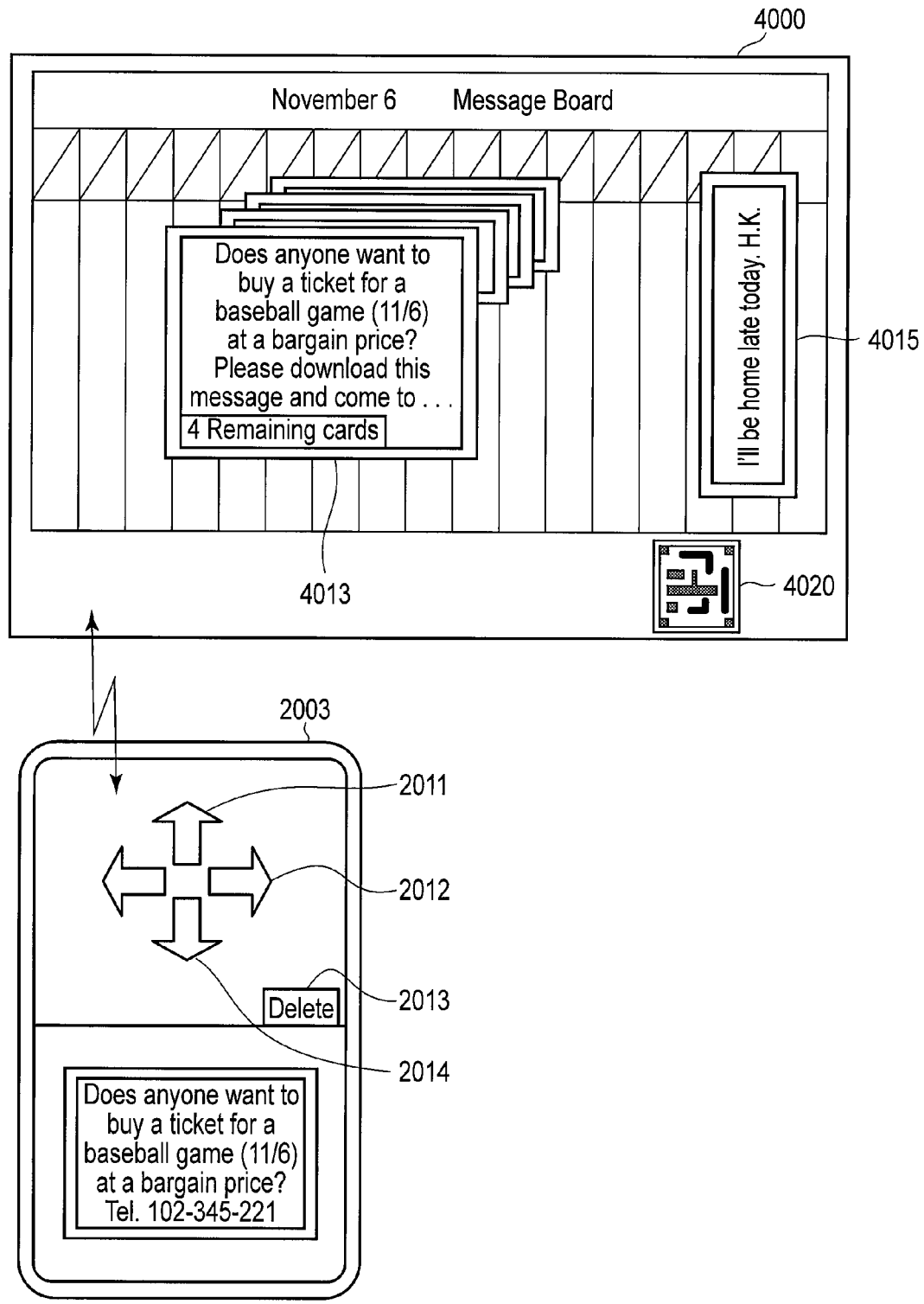
FIG. 7 is an explanation diagram shown for explaining a typical operation example of the embodiment, and shows a display example of the signage terminal and a handling example of the portable terminal.

FIG. 7 shows a case where the contents of the card 4013 are as follows: "Does anyone want to buy a ticket for a baseball game today at a bargain price?" "Please download this message and come to . . . ". In the case of the card 4013 of this kind, many people will want to buy the ticket. Therefore, the ticket provider (the user who uploaded the card) can limit the number of downloading times. The example of FIG. 7 shows that cards are piled in such a way that people can immediately (and visually) recognize that the remaining number of times for downloading the card is four. In the example of FIG. 7, the number of remaining cards is reduced one by one every time the card is downloaded.

In the above example, the number of downloading times is restricted. However, the period or time in which download is possible may be limited. For example, when the bargain offer of a product is advertised through a card, the period or time of the advertisement may be set. If the period or time is set, the card is automatically deleted after the determined period or time passed.

Figure 8A:
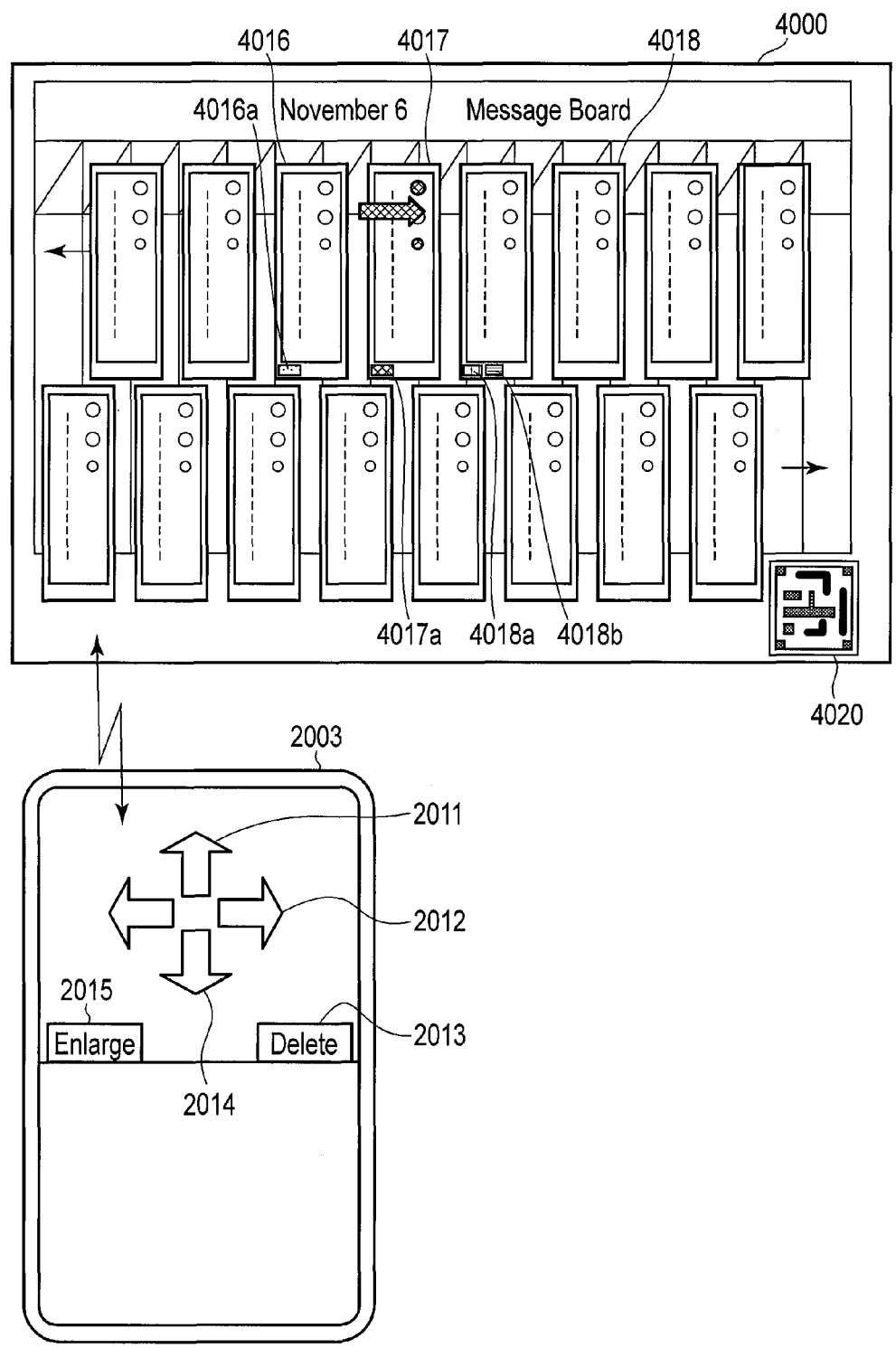
FIG. 8A is an explanation diagram shown for explaining a typical operation example of the embodiment, and shows a display example of the signage terminal and a handling example of the portable terminal.

FIG. 8A shows an example in which there are many postings in the signage terminal 4000 and cards are minified to be displayed. In the digital signage system of the embodiment, for example, hundred postings are possible on one signage terminal. In the display example shown in FIG. 8A, identifiers (identifying display) 4016a (card 4016), 4017a (card 4017), 4018a and 4018b (card 4018) which can be confirmed by sight by the users themselves who are currently in the access are displayed at predetermined positions near the cards in such a way that the simultaneous access of a plurality of users to a plurality of cards (or simultaneous access of a plurality of users to one card) can be recognized. The identifiers (identifying display) can be displayed by, for example, a color bar (marking by color), color application to the outer frame of a card (change in color of the whole periphery or a part of the outer frame of a card), display of the machine type in accordance with the media access control (MAC) address of a portable terminal, display of some numbers of a telephone number (of a portable terminal), or combinations of these examples. Of course, in order of access, consecutive numbers (a series of numbers) from 1 is possible. In this case, a series of numbers corresponding to the order of access is transmitted from the signage terminal 4000 to an individual portable terminal (user). A series of numbers is preferably maintained as same numbers until communication with portable terminals (users) finish.

Figure 8B:
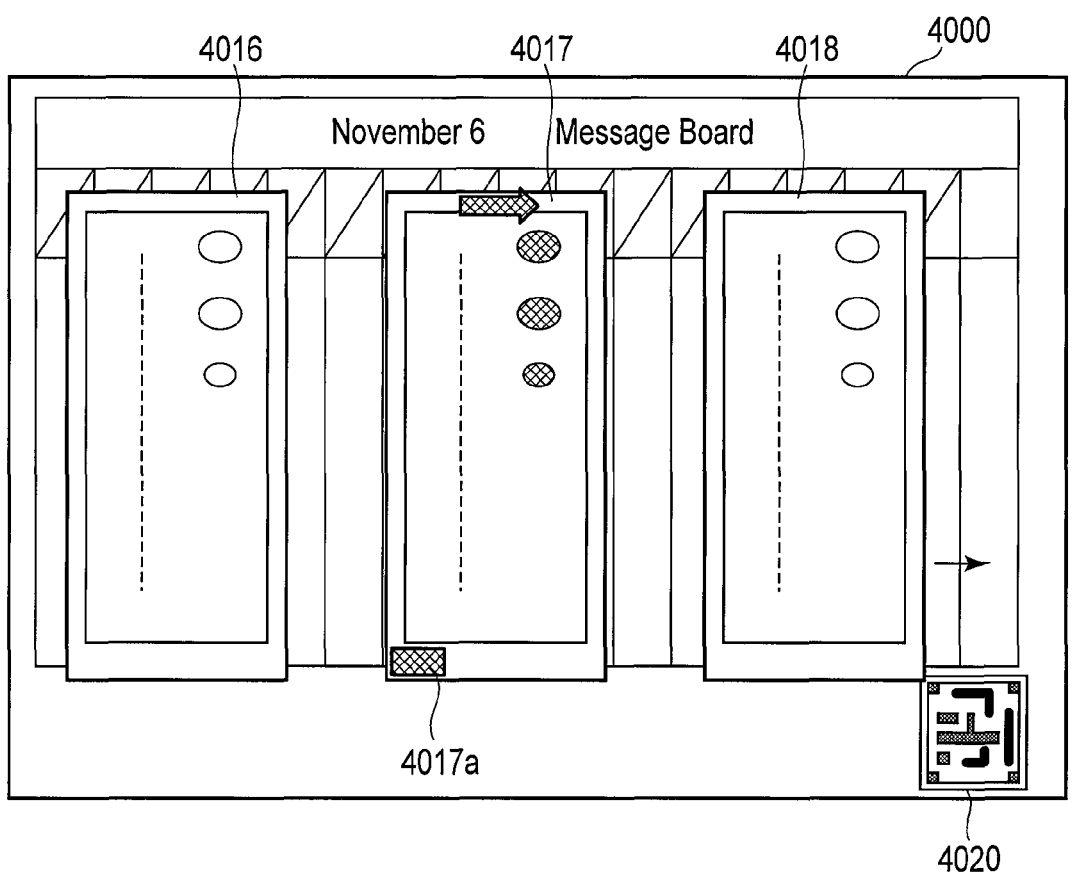
FIG. 8B is an explanation diagram shown for explaining the operation example of the embodiment, and shows a display example of the signage terminal.

FIG. 8B shows an example in which the card 4017 selected by a user from many cards displayed in the signage terminal 4000 is enlarged to be displayed.

The embodiment showing the change in the display state from FIG. 8A to FIG. 8B is an example of a case where a function of enlarging and displaying a card is operated. When many cards are minified and displayed in the signage terminal 4000, a user may have difficulty seeing the contents of the cards. Therefore, when a user selects the desired card and for example, touches an enlargement button 2015 of the portable terminal 2003 as shown in FIG. 8A, the desired card 4017 is enlarged and displayed as shown in FIG. 8B. The display example of FIG. 8A shows jump to the first card from the left end of the second row (lower stage) when the selection mark 2012 is pressed, after the first card from the right end in the first row (upper stage). However, the selection mark 2012 may operate to the card right under the first card from the right end of the first row (the first card from the right end of the second row), and then moved one by one toward the cards on the left side.

Figure 9:
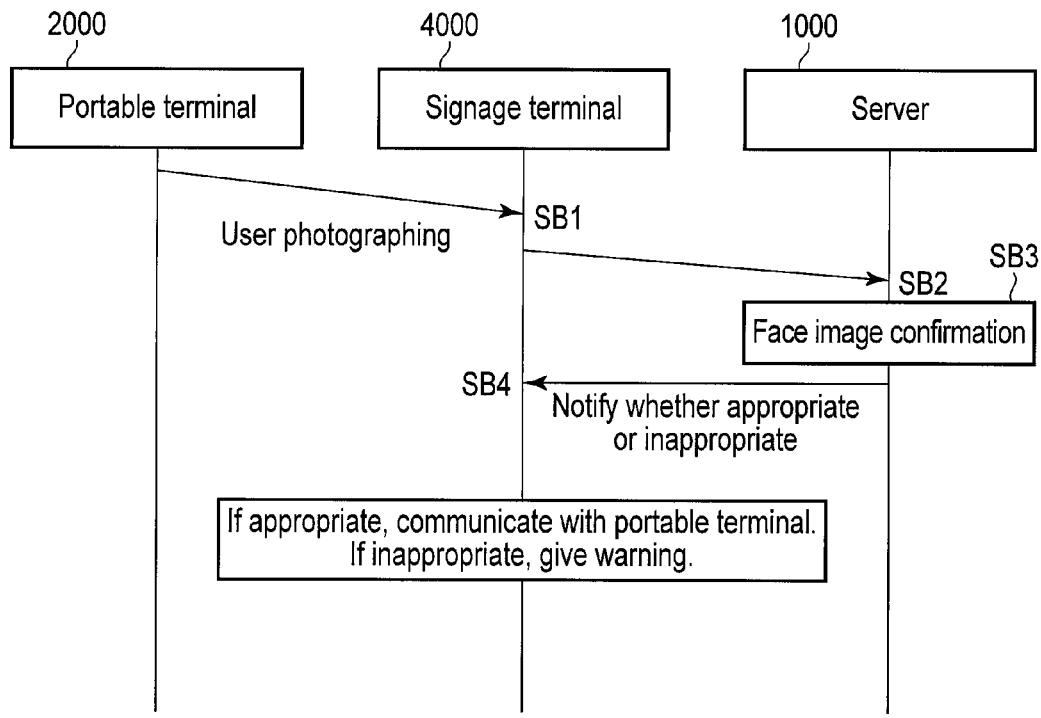
FIG. 9 is an explanation diagram shown for explaining the operation example of the embodiment, and shows an example of handling and operation timings.

FIG. 9 shows a system operation example of a case where the signage terminal 4000 is configured to recognize the user of the portable terminal 2000. The signage terminal 4000 is configured to obtain the portable terminal number of the portable terminal 2000 or the face image of the user (step SB1). The signage terminal 4000 transmits the obtained user information, for example, the face image, to the server 1000 (step SB2).

After that, the server 1000 is configured to specify the user by means of the face image of the user and the database, and determine whether the user is appropriate or inappropriate (step SB3). An inappropriate user is, for example, a criminal, or a person who has vandalized a signage terminal. In such a case, the server 1000 is configured to transmit a warning screen, a warning message, or warning sound, etc., to the signage terminal 4000 (step SB4).

Figure 10:
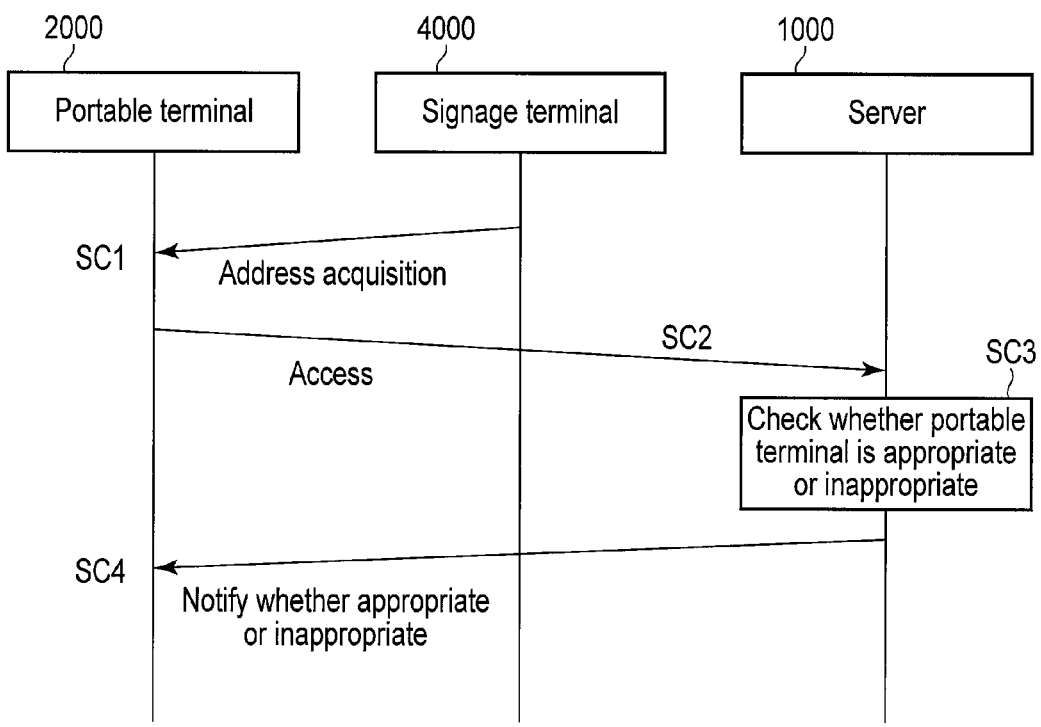
FIG. 10 is an explanation diagram shown for explaining a typical operation example of the embodiment, and shows examples of handling and operation timings.

FIG. 10 shows a system operation example of a case where the server 1000 is configured to recognize the user of the portable terminal 2000. The portable terminal 2000 obtains an address from the signage terminal 4000 (step SC1). The signage terminal 4000 conducts line connection with the server 1000 by use of the obtained address (SC2). At this time, the server 1000 determines whether or not the user is suitable to use the signage based on the portable number of the portable terminal 2000 (identification data (ID) unique to the user) (step SC3). When the user is inappropriate, the server 1000 notifies the portable terminal 2000 of the user that the user is inappropriate (SC4).

For example, when a card is available for special members, the above-described determination regarding whether the user is appropriate or inappropriate may be performed.

Figure 11:
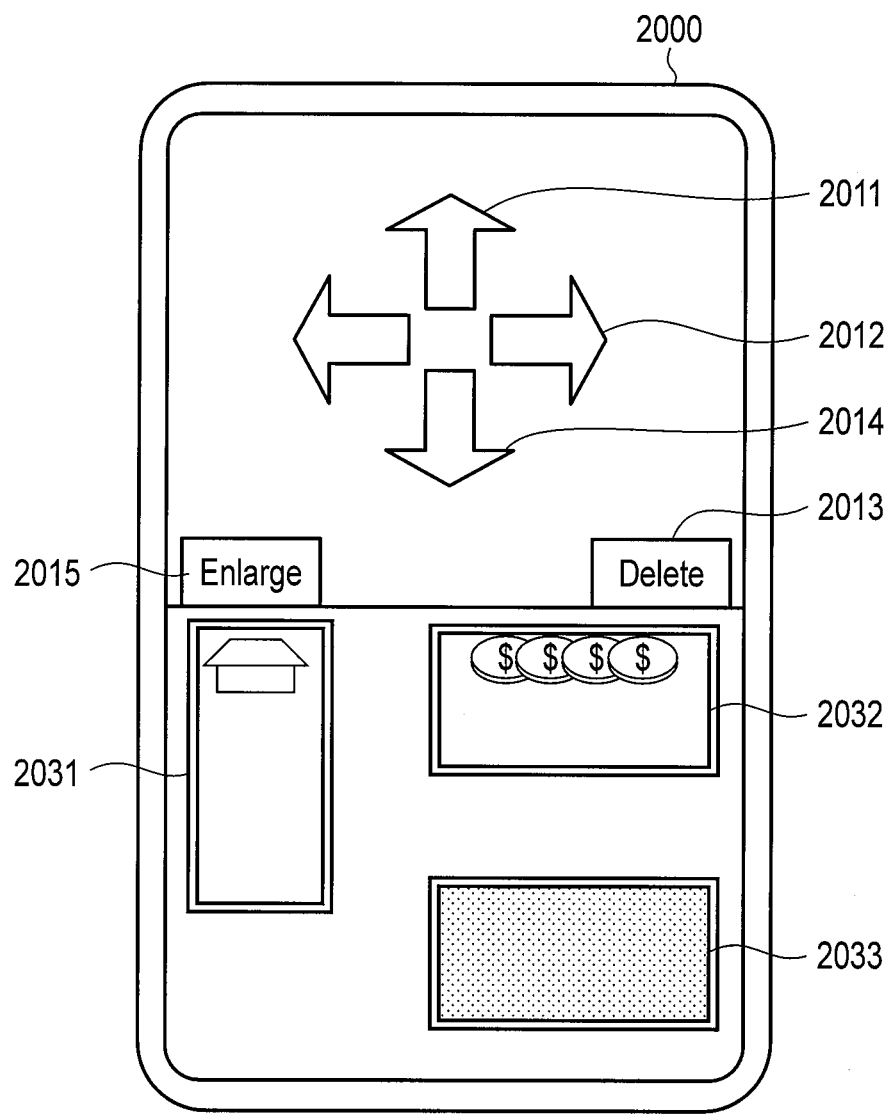
FIG. 11 is an explanation diagram shown for explaining a typical operation example of the embodiment, and shows a display example of the signage terminal.

FIG. 11 shows that a template to be used can be selected from various types of templates when the portable terminal 2000 requests the server 1000 for a card template. FIG. 11 shows various types of templates 2031, 2032 and 2033 having different designs and colors.

Figure 12:
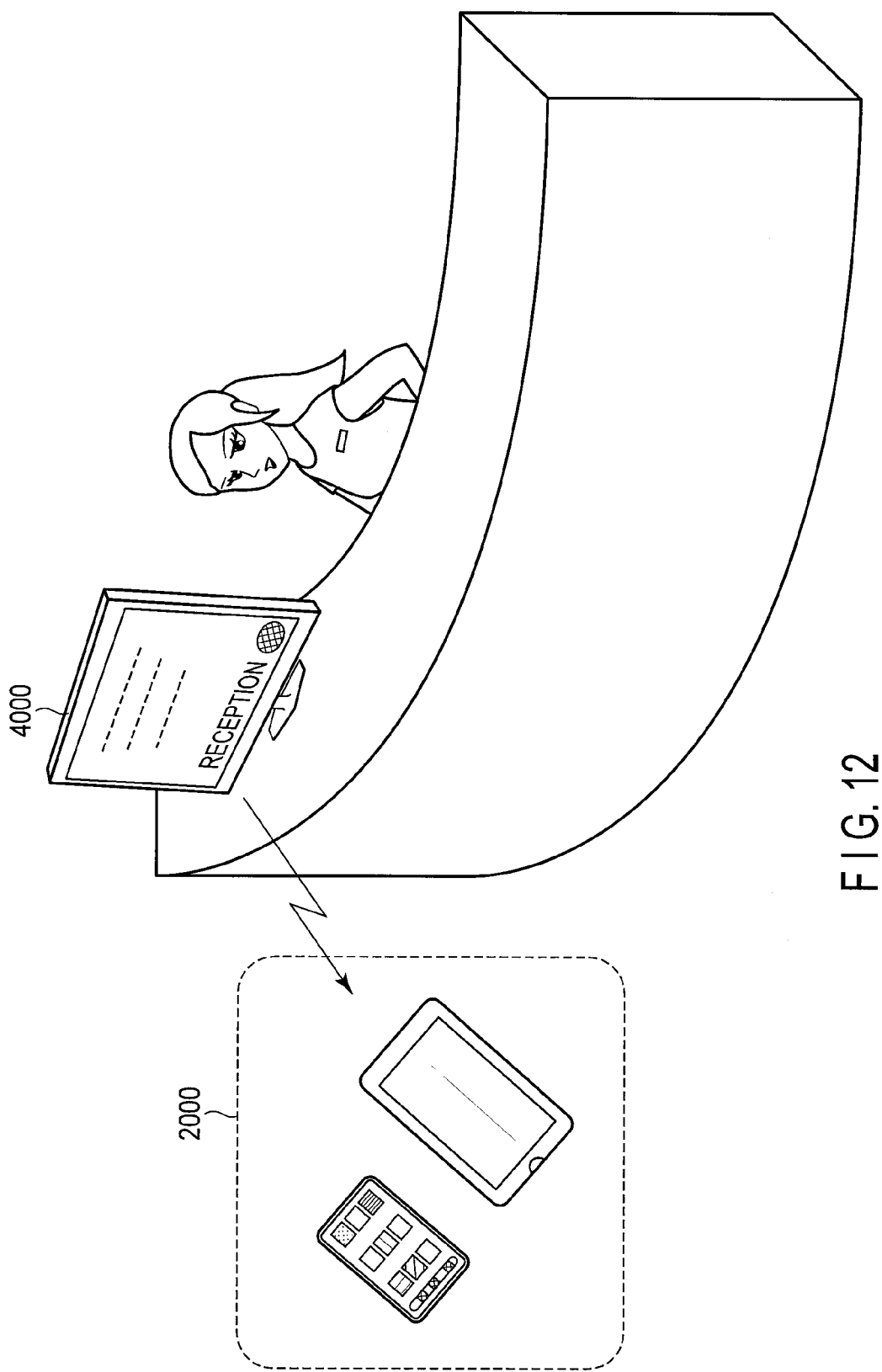
FIG. 12 is shown for explaining a typical example of the embodiment.

FIG. 12 shows an example in which the signage terminal 4000 is used at the reception of a hospital. The signage terminal 4000 is used for registration for the order of consultations of patients who visit the hospital. At this time, a user can receive a card for registration for the order of consultations from the server. When the user writes his/her name in the card and uploads it, the name is displayed in the signage terminal 4000 for consultation acceptance, and the registration for the order of consultations is completed.

When a download operation is conducted in the portable terminal 2000 of the user, the signage terminal 4000 can determine that the user cancelled the consultation or entered a consultation room. It is possible to notify the portable terminal of a user whose order is, for example, the fifth after the current user who cancelled consultation or entered the consultation room that the consultation is approaching.

Figure 13A:
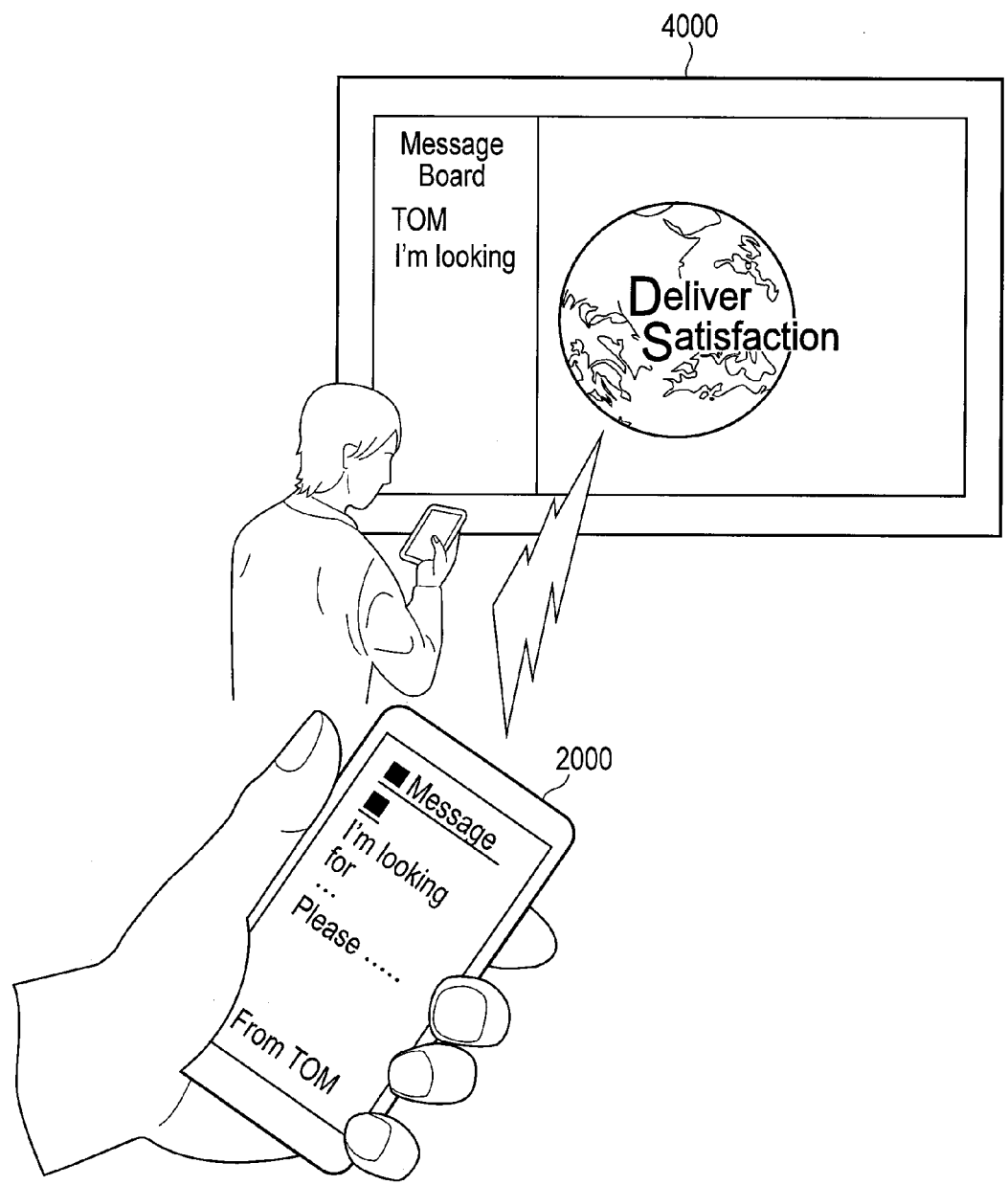
FIG. 13A is shown for explaining an example of the state of use when the embodiment is used.

FIG. 13A shows that, for example, Tom operates the portable terminal (smartphone) 2000 and posts a card in which a message is described on the signage terminal 4000.

Figure 13B:
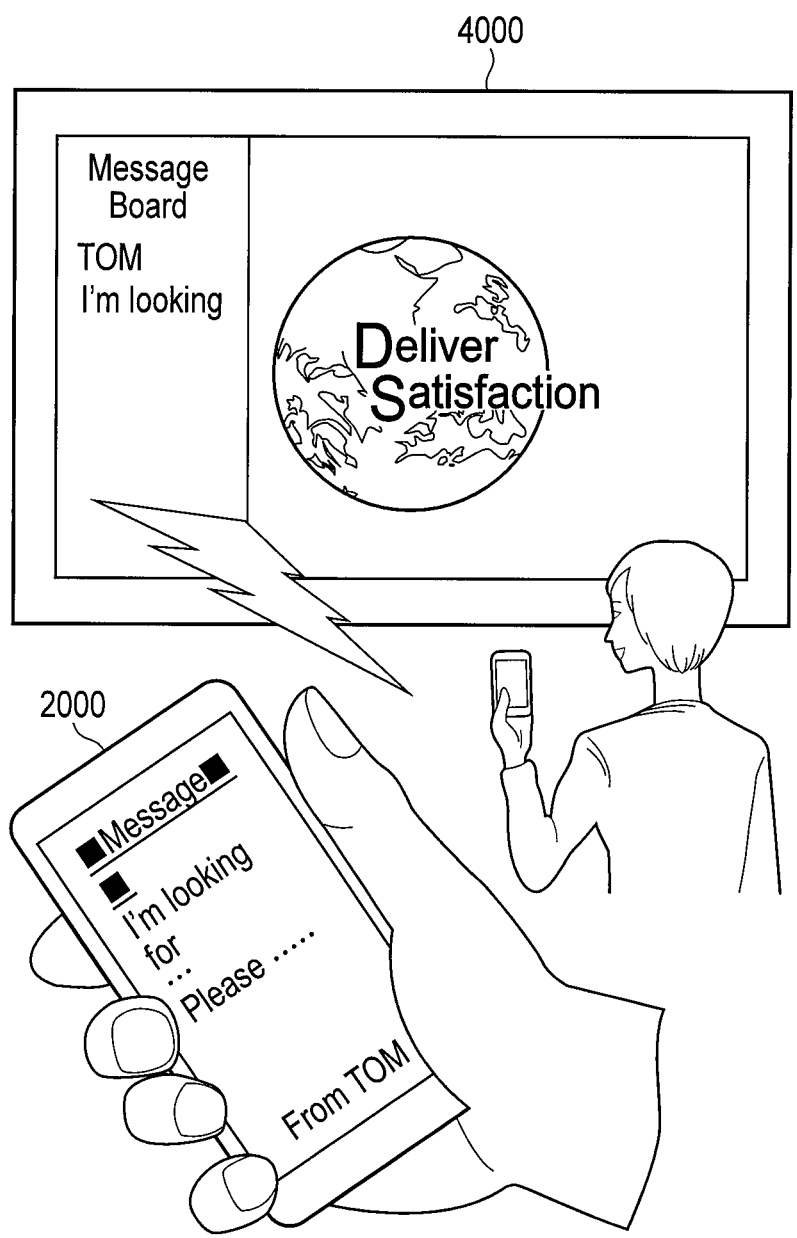
FIG. 13B is shown for explaining an example of the state of use when the embodiment is used.

FIG. 13B shows that, for example, Betty operates the portable terminal (smartphone) 2000 and downloads the message posted by Tom while she looks at the signage terminal 4000.

Figure 14:
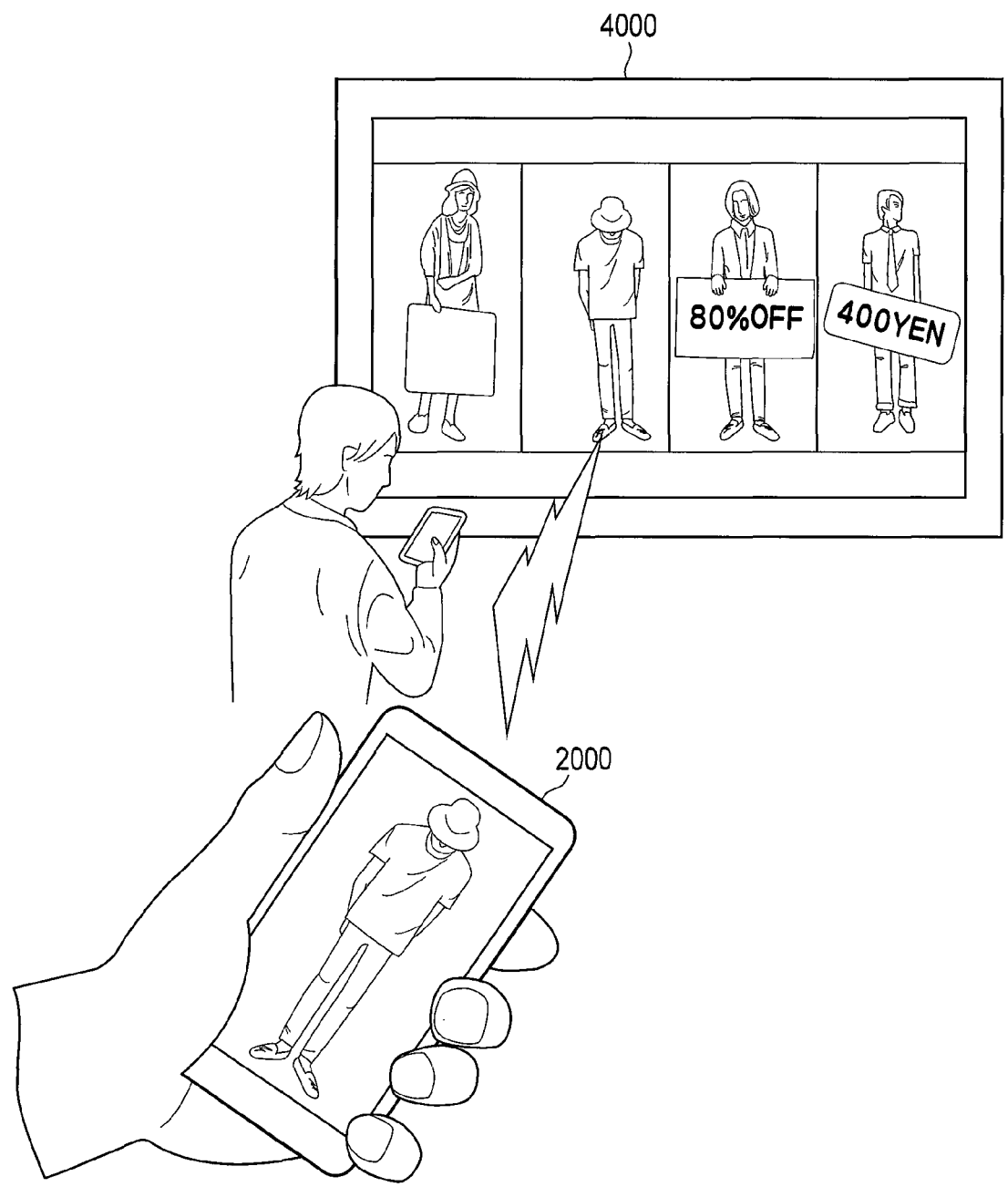
FIG. 14 is shown for explaining an example of the state of use when the embodiment is used.

FIG. 14 shows the following state. Tom takes pictures of persons or takes pictures for a catalog by means of a camera function of the portable terminal 2000, prepares a card for posting by attaching the pictures to the card, and posts the card on the signage terminal 4000. In this case, a message may be added to the card together with the photos. The message may be input by, for example, handwriting, a stylus, or from a keyboard.

Figure 15:
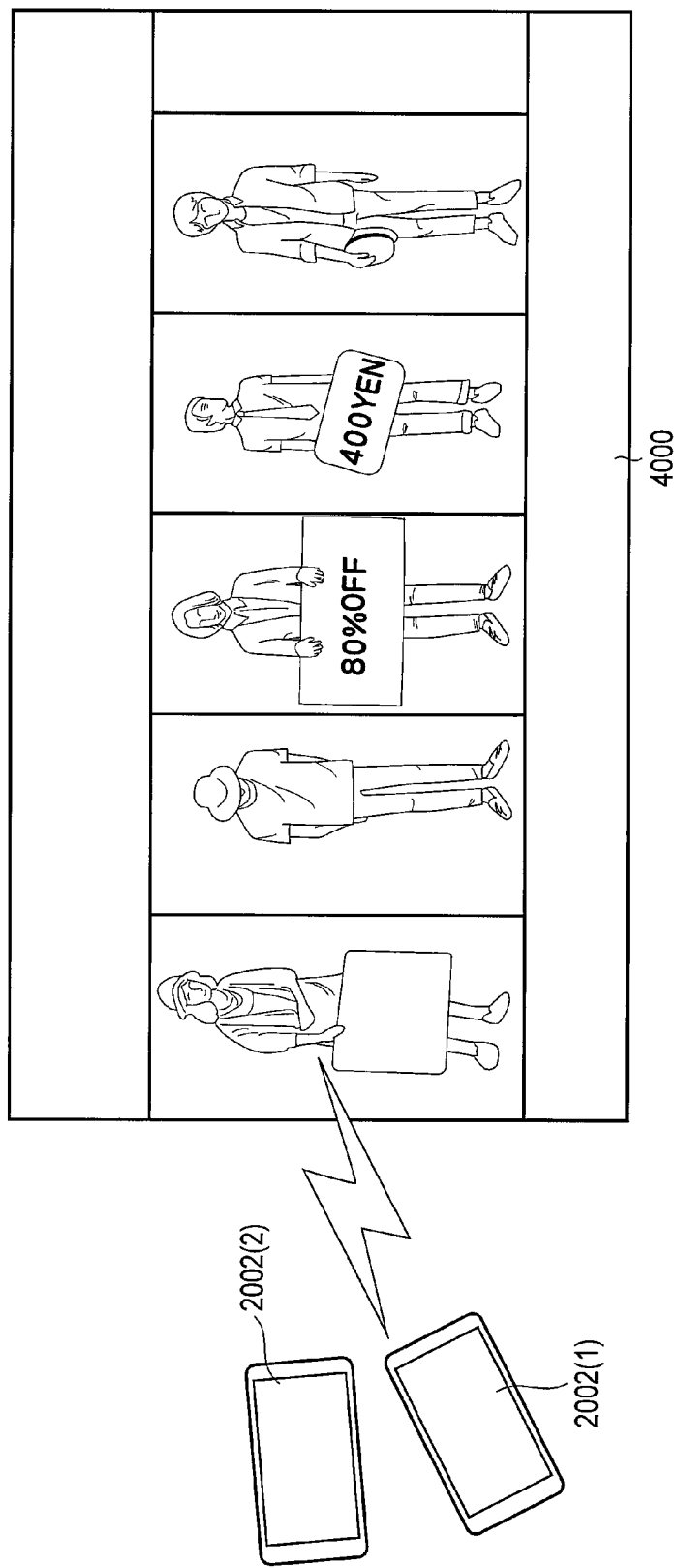
FIG. 15 is shown for explaining an example of the state of use when the embodiment is used.

FIG. 15 shows that, for example, a plurality of clothing stores post advertisement of clothing by means of smartphones (one store may post a plurality of cards). A staff of a clothing store takes pictures of models or mannequins by means of a camera function of a portable terminal (for example, a smartphone). Next, the user attaches the photographs to a card to be used by operating the portable terminal. The user goes to an area around a signage terminal near the store in order to post the card having the contents of the photographs. In this case, audio data may be posted together with the card. When a user downloads the card, the user can also receive voice-guided explanation by the smartphone in which the card is downloaded.

Figure 16:
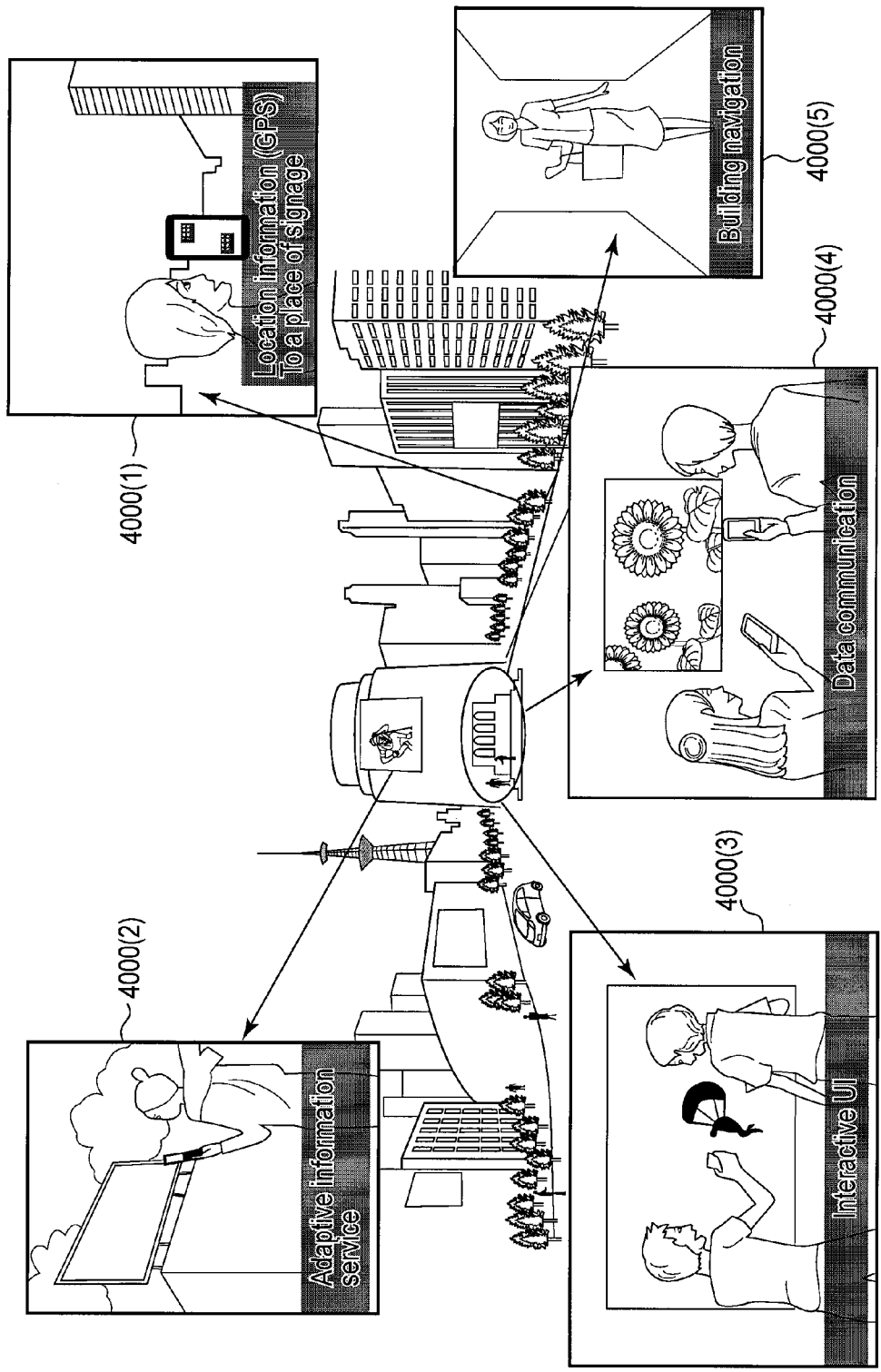
FIG. 16 is shown for explaining an example of the state of use when the embodiment is used.

FIG. 16 illustrates typical examples showing in which kind of places the signage terminal of this embodiment is set. For example, the signage 4000 (1) may be set in the lateral of a road of a building. For example, the large-scale signage 4000 (2) may be set on the wall surface of a building. For example, the signages 4000 (3) and 4000 (4) may be provided in the entrance and information of a building. The signage 4000 (5) may be set inside a building.

Figure 17:
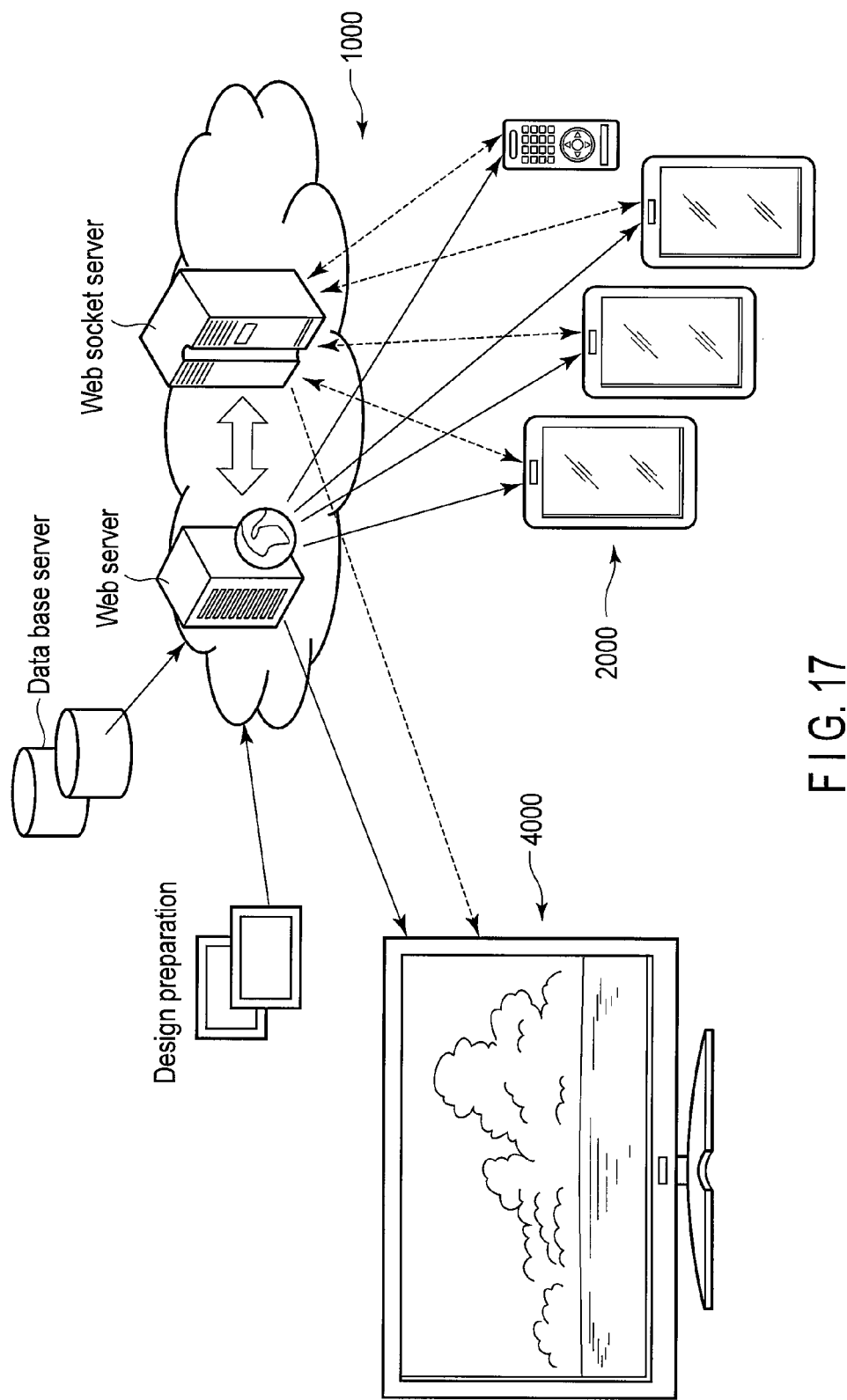
FIG. 17 is shown for explaining an example of the state of use when the embodiment is used.

FIG. 17 is an example showing with which portions portable terminals of users for using the signage terminal of the embodiment practically conduct electric communication.

The portable terminal 2000 communicates with a web socket server and a web server in practice. At this time, the signage terminal 4000 set near the portable terminal 2000 is controlled by the server, and is configured to behave as if the signage terminal 4000 communicates with the portable terminal 2000.

Each of the structural elements described above may be divided into two or more elements in claims. A plurality of structural elements may be combined in claims. Further, the divided and combined elements in this manner may be combined in claims. All of these elements are within the scope of the embodiments of the present invention. Even when a claim is directed to a method, the apparatus of the embodiments of the present invention is applied to the claim. The processes in the signage terminal, and the processes in the server may be operated by programs or instructions of a computer. Of course, an information storage medium (disk or semiconductor memory) from which data can be read by a computer may be used.

In the above-described signage system, communication between the signage terminal and a portable terminal is preferably one-to-one communication with a user who actually looks at a card (information) displayed by the signage terminal. Therefore, it is possible to enhance the utility value of the signage system by recognizing that the user is located near the signage terminal by means of face identification, GPS, or change of a code depending on the time as described above.

The technical terms used above in relation to the embodiments and the names or technical terms described in the drawings are in no way restrictive. For example, the processor may be replaced with processing means, a processing unit, or a processing module. Likewise, the controller may be replaced with control means, a control unit, or a control module. The managing unit may be replaced with a manager, managing means, or a managing module. The generator may be replaced with generating means, a generating unit, or a generating module. The storage unit may be replaced with storage means, a storage or a storage module. The collection and correction unit may be replaced with collection and correction means, or a collection and correction device. The registration unit may be replaced with registration means, a registration device, or a registration module.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information communication method of a portable terminal in communication with a signage terminal and a server, comprising:

obtaining an address for accessing the server from the signage terminal, by the portable terminal;

generating information for displaying a message in the signage terminal, by the portable terminal;

transmitting the information to the server from the portable terminal by using the address obtained from the signage terminal; and displaying the information along with the message, which is received from the server via a network, at the signage terminal, wherein the portable terminal is configured to control the information of the signage terminal via the network, wherein the portable terminal is configured to download the information displayed in the signage terminal, and a number of times the information can be downloaded is limited.

2. The information communication method of claim 1, wherein the portable terminal is configured to obtain the address by reading a code displayed in a screen of the signage terminal.

3. The information communication method of claim 1, wherein the portable terminal and the signage terminal communicate with each other in a short distance in order to obtain the address.

4. The information communication method of claim 1, wherein the signage terminal is configured to determine a position of the portable terminal based on GPS data from the portable terminal.

5. The information communication method of claim 1, wherein the signage terminal is configured to identify a face of a user of the portable terminal in order to provide the portable terminal with the address.

6. The information communication method of claim 1, wherein the signage terminal is configured to control an access privilege by which the portable terminal accesses the server.

7. The information communication method of claim 1, wherein the server is configured to begin communication with the portable terminal when the portable terminal is a specific portable terminal.

8. The information communication method of claim 1, wherein the portable terminal is configured to obtain a template for generating the message from the server.

9. The information communication method of claim 1, wherein an operation mark for specifying one of a plurality of messages displayed in the signage terminal is displayed in the portable terminal.

10. The information communication method of claim 1, wherein the portable terminal is configured to display a posting mark for transmitting the message to the server.

11. The information communication method of claim 1, wherein the portable terminal is configured to output a deletion signal deleting the information transmitted to the server.

12. The information communication method of claim 1, wherein the portable terminal is configured to display a download mark for downloading the message displayed in the signage terminal.

13. The information communication method of claim 1, wherein the signage terminal is configured to display an identifier
which can be confirmed by the user who is currently in access at predetermined positions near the identifier.

14. The information communication method of claim 13, wherein the signage terminal is configured to transmit one of numbers to the portable terminal which currently communicates with the server.

15. The information communication method of claim 1, wherein the message shows an advertisement for a bargain offer of a product.

16. The information communication method of claim 2, wherein the code is changed depending on a time.

17. A signage terminal which communicates a server and a portable terminal, comprising:
- a receiver configured to receive information through the server;
- a display unit configured to display the information received by the receiver;
- a download controller configured to download the information displayed on the display unit into the portable terminal; and
- a download managing unit configured to manage conditions under which the information can be downloaded in a case where the download controller downloads the information.

18. The signage terminal of claim 17, wherein the download controller performs downloading on the portable terminal through near field communication.

19. The signage terminal of claim 17, wherein the download controller starts downloading in response to a request from the portable terminal.

20. The signage terminal of claim 17, wherein as conditions under which the download controller can download the information into the portable terminal, the download managing unit manages a number of times, time and a period.

* * * * *